May 27, 1952
E. R. SKORUPA ET AL
2,598,314
WALL MOUNTED CAN OPENER
Filed Feb. 13, 1951
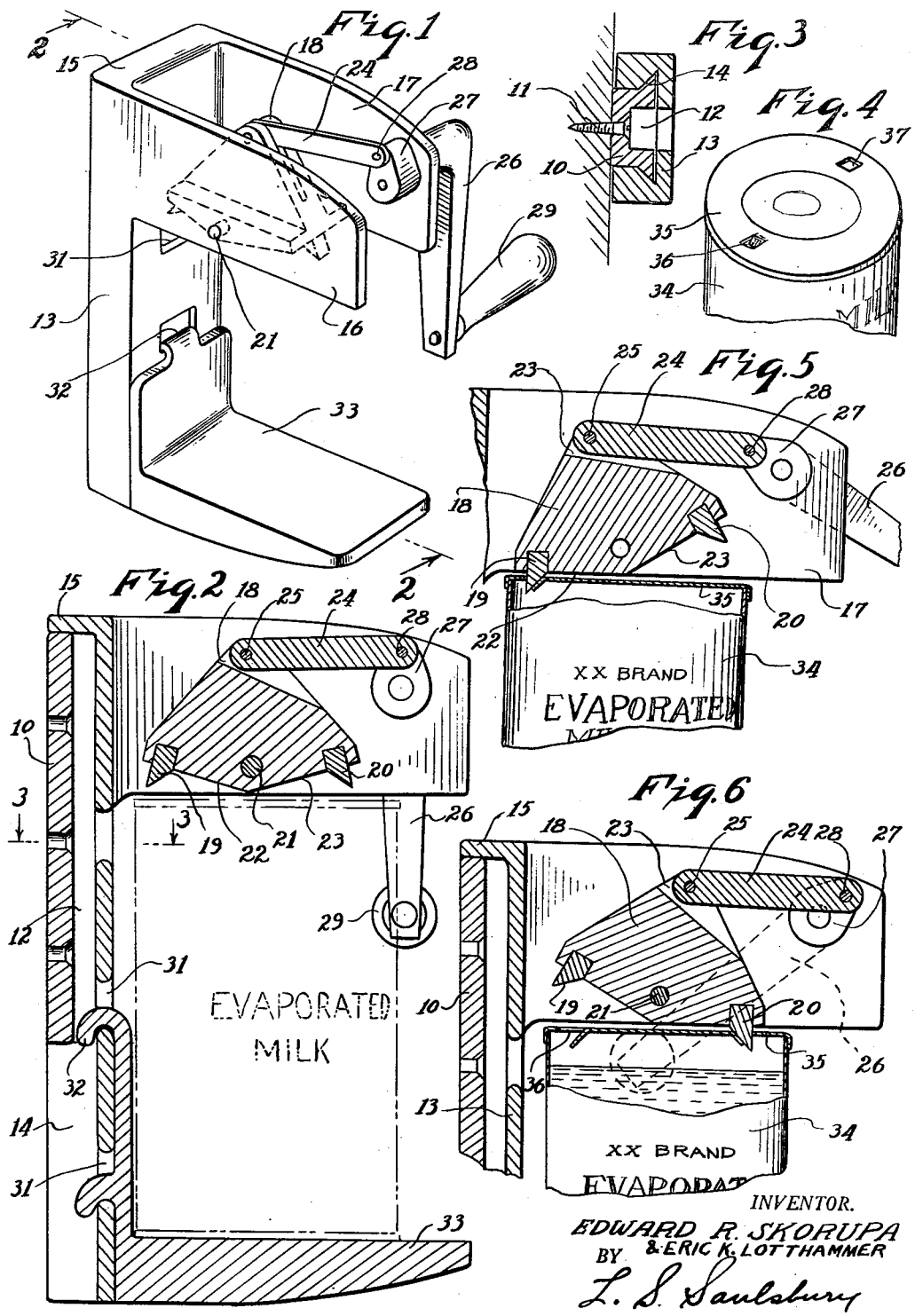
INVENTOR.
EDWARD R. SKORUPA
& ERIC K. LOTTHAMMER
BY
L. S. Saulsbury
ATTORNEY Patented May 27, 1952

2,598,314

UNITED STATES PATENT OFFICE 2,598,314

WALL MOUNTED CAN OPENER

Edward R. Skorupa, Columbus, Nebr., and Eric K. Lotthammer, Jamaica, N. Y., said Lotthammer assignor to said Skorupa Application February 13, 1951, Serial No. 210,694

5 Claims. (Cl. 30—6.1)

This invention relates to a wall mounted milk can opener.

It is an object of the present invention to provide a wall mounted milk can opener wherein the opposite sides of the top of a milk can can be readily punctured by the mere operation of the turning of a crank once the milk can has been deposited on a shelf bracket disposed under the puncturing member.

It is an other object of the invention to provide in a wall mounted milk can opener a mounting bracket for the puncturing element and for the crank for operating the same wherein the support member which is mounted on the bracket can be adjusted by a simple lifting of the support from openings on the bracket and locating the support in different openings on the bracket, the openings on the bracket being spaced according to the different sizes of cans in everyday use.

Other objects of the present invention are to provide a wall mounted milk can opener which is easy to mount upon the wall, of simple construction, has a minimum number of parts, inexpensive to manufacture, and efficient in operation.

For other objects and for a better understanding of the invention, reference may be had to the following detailed description taken in connection with the accompanying drawing, in which Fig. 1 is a perspective view of the wall mounted milk can opener embodying the features of the present invention.

Fig. 2 is a vertical sectional view taken on line 2—2 of Fig. 1.

Fig. 3 is a transverse sectional view taken on line 3—3 of Fig. 2.

Fig. 4 is a top perspective view of a milk can after it has been punctured with the present device.

Fig. 5 is a fragmentary sectional view showing the puncturing element adjusted to effect the puncturing of one opening in the can.

Fig. 6 is a fragmentary sectional view after the puncturing element has been adjusted to puncture the second hole in the can, the crank arm being turned to a different position from that shown in Fig. 5.

Referring now to the figures, 10 represents a dovetail mounting member which is fixed to a wall by wood screws 11. The screws enter the member through a hole 12 and are tightened upon the wall in the usual manner with a screw driver. A main bracket 13 has a dovetail groove 14 for receiving the dovetail member 10 and the bracket 13 comes to rest with its projection 15 against the upper end of the dovetail member 10. The bracket 13 has forwardly extending transversely spaced supporting portions 16 and 17 between which is pivoted a puncturing member 18 having puncturing elements 19 and 20. A pivot pin 21 extends between the portions 16 and 17 and through the puncturing member 18 whereby the puncturing member can be rocked to use either puncturing element 19 or the puncturing element 20. The bottom edge of the puncturing member 18 is cut away to provide angled edges 22 and 23 from which puncturing elements 19 and 20 respectively extend. By these edges being angled, angular displacement of the puncturing member 18 can be effected. The upper end of the puncturing member 18 is bifurcated, as indicated at 23, to receive an operating link 24. A pin 25 connects the link 24 to the bifurcations 23. On the portion 17 is a crank 26 having a crank arm 27 to which the link 24 is connected by pin 28. The crank 26 has a handle 29 journalled thereon.

The wall of the bracket 13 has a plurality of vertically spaced openings 31 into which hook portions 32 of a supporting shelf 33 can be extended. The shelf 33 can accordingly be retained at different positions depending upon the size of the can to be punctured. The can is indicated at 34 and has a top portion 35. By rotating the crank 26, the puncturing member 18 will be rocked on the pivot pin 21 so that the puncturing elements 19 and 20 will enter the top portion 35 of the can 34. With one turn of the crank, both holes 36 and 37 will be made or struck in the top portion 35 of the can. The alignment of the can with the puncturing member 18 is effected automatically by placing the can on the shelf 33.

Because of the long arm of the crank and the linkage connection, the leverage is amplified so that little effort is required to turn the crank to effect the puncturing. The adjustment of the shelf 33 can be effected in an easy manner so that the can opener is readily adapted for the different size cans.

It will now be apparent that there has been provided a wall mounted milk can opener which is of simple construction, easy to install and operate, has a minimum number of parts and efficient in use.

While various changes may be made in the detail construction, it shall be understood that such changes shall be within the spirit and scope of the present invention as defined by the appended claims.

What is claimed is:

1. A milk can opener comprising a support, a shelf on said support for receiving a can, the puncturing member pivotally connected to said support to rock back and forth and puncturing elements laterally spaced from one another connected to the opposite ends of the puncturing member and at the opposite sides of its pivot connection with the support and means for rocking said puncturing member.

2. A milk can opener comprising a support, laterally spaced portions extending from said support and adapted to overlie the top portion of a can, a puncturing member pivotally connected between the laterally spaced portions of the support, said puncturing member having puncturing elements disposed at the opposite sides of the pivot connection with the spaced portions and means on one of the spaced portions and connected with the puncturing member for rocking said puncturing member.

3. A milk can opener comprising a support, laterally spaced portions extending from said support and adapted to overlie the top portion of a can, a puncturing member pivotally connected between the laterally spaced portions of the support, said puncturing member having puncturing elements disposed at the opposite sides of the pivot connection with the spaced portions and means on one of the spaced portions and connected with the puncturing member for rocking said puncturing member, said means for rocking said puncturing member comprising a crank pivoted on one of the spaced portions, a crank arm, a link pivoted to the crank arm, said puncturing member having a bifurcated portion and said link extending into said bifurcated portion and pivoted thereto and a handle on said crank.

4. A milk can opener comprising a support, laterally spaced portions extending from said support and adapted to overlie the top portion of a can, a puncturing member pivotally connected between the laterally spaced portions of the support, said puncturing member having puncturing elements disposed at the opposite sides of the pivot connection with the spaced portions and means on one of the spaced portions and connected with the puncturing member for rocking said puncturing member, a shelf adjustable upon said support for receiving the cans whereby said can opener may be adapted for use upon the top portion of different size cans.

5. A wall mounted milk can opener comprising a bracket member, a mounting member adapted to be secured to the wall and said bracket member releasably connected to said mounting member, said bracket member having laterally spaced horizontal projections, a can supporting shelf mounted on said bracket and extending underneath the horizontal portions, a puncturing member pivotally connected to the horizontal portions and disposed therebetween, said puncturing member having angled bottom edges, puncturing elements connected respectively to the edges of the puncturing member and at the opposite sides of the pivot connection of the puncturing member with the spaced portions, said puncturing elements adapted as the puncturing member is rocked to strike openings in the top of a can resting upon said shelf and lying under the puncturing member, and crank operating means carried by one of the horizontal portions and connected with the puncturing member to rock the same as the crank means is turned.

EDWARD R. SKORUPA.
ERIC K. LOTTHAMMER.

No references cited.